(12) United States Patent
Gilley et al.

(10) Patent No.: US 11,617,078 B2
(45) Date of Patent: Mar. 28, 2023

(54) P25 RADIO THAT FUNCTIONS AS A KEY MANAGEMENT FACILITY OR A KEY FILL DEVICE

(71) Applicant: BK Technologies, Inc., West Melbourne, FL (US)

(72) Inventors: James E. Gilley, Baldwin City, KS (US); Edmund A. Laryea, Sunrise, FL (US); Juan J. Giol, Davie, FL (US); Lorenzo Cruger, Jr., Boynton Beach, FL (US)

(73) Assignee: BK Technologies, Inc., West Melbourne, FL (US)

( * ) Notice: Subject to any disclaimer, the term of this patent is extended or adjusted under 35 U.S.C. 154(b) by 67 days.

(21) Appl. No.: 17/234,563

(22) Filed: Apr. 19, 2021

(65) Prior Publication Data
US 2022/0338003 A1   Oct. 20, 2022

(51) Int. Cl.
| | |
|---|---|
| *H04W 4/06* | (2009.01) |
| *H04W 12/0431* | (2021.01) |
| *H04W 8/24* | (2009.01) |
| *H04W 84/18* | (2009.01) |
| *H04W 12/30* | (2021.01) |

(52) U.S. Cl.
CPC ......... *H04W 12/0431* (2021.01); *H04W 4/06* (2013.01); *H04W 8/245* (2013.01); *H04W 12/35* (2021.01); *H04W 84/18* (2013.01)

(58) Field of Classification Search
CPC .............................. H04W 12/04; H04W 12/35
See application file for complete search history.

(56) References Cited

U.S. PATENT DOCUMENTS

| | | | |
|---|---|---|---|
| D295,631 S | 5/1988 | Wells-Papanek et al. | |
| D295,634 S | 5/1988 | Wells-Papanek et al. | |
| D295,637 S | 5/1988 | Wells-Papanek et al. | |
| D296,705 S | 7/1988 | Wells-Papanek et al. | |
| D298,144 S | 10/1988 | Wells-Papanek et al. | |
| D382,867 S | 8/1997 | Arnone | |
| 9,143,321 B2 * | 9/2015 | Senese | H04W 12/0433 |
| 2005/0220307 A1 | 10/2005 | Boerger | |
| 2011/0135097 A1 * | 6/2011 | Redfern | H04L 9/0891 |
| | | | 380/279 |
| 2012/0183143 A1 * | 7/2012 | Kruegel | H04W 12/04 |
| | | | 380/277 |

OTHER PUBLICATIONS

Tactical Key Management Device (TKMD), PDF brochure.
P25, How To—A Tutorial on the Setup and Use of Motorola ASTRO 25 Tactical OTAR, document, Jul. 2012, Version 1.

* cited by examiner

*Primary Examiner* — Michael T Vu
(74) *Attorney, Agent, or Firm* — Kirton McConkie; Brian Tucker (57) ABSTRACT

A P25 radio can be configured to implement a key management facility to thereby manage keysets for and provision the keysets on other P25 radios in a communications system. The P25 radio, as a radio, can directly communicate with the other P25 radios to provision keysets in accordance with the OTAR protocol. The P25 radio may also be configured to function as a key fill device to thereby provision keysets manually on any of the other P25 radios to which it may be physically or wirelessly connected. The P25 radio may also be configured to use the keysets to communicate securely with any of the other P25 radios.

20 Claims, 13 Drawing Sheets

P25 RADIO THAT FUNCTIONS AS A KEY MANAGEMENT FACILITY OR A KEY FILL DEVICE

CROSS-REFERENCE TO RELATED APPLICATIONS

N/A

BACKGROUND

APCO Project 25 or P25 is a suite of standards that apply to public safety and first responder communication systems. A primary goal of P25 is to ensure interoperability among land mobile radios (or P25 radios) and other equipment or components of a communication system.

P25 establishes guidelines for securing communications between P25 radios through the use of encryption keys. For example, in a P25-compliant communication system, P25 radios may be configured to implement AES-256 encryption to secure the content of voice and data communications sent within the system.

To implement AES-256 (or another symmetric encryption algorithm), both the sender and the receiver must know the encryption key that is used to encrypt any given communication. In particular, the sender uses the encryption key, such as a traffic encryption key or TEK, to encrypt the content of the communication and then sends the encrypted content, while the receiver receives the encrypted content and uses the same encryption key to decrypt it. Accordingly, for any P25-compliant radio to securely communicate, it will need to store the appropriate encryption key(s) that are currently in use.

To enhance security, the encryption keys and other elements of the encryption scheme may be periodically updated. For example, a new keyset (e.g., a set of TEKs and other encryption parameters) may be provisioned to authorized P25 radios to ensure that only those authorized P25 radios will be able to communicate over the communication system. In other words, the periodic provisioning of new/different keysets ensures that any encryption key that may have been compromised will eventually become incapable of decrypting secure voice or data communications.

Figure 1:
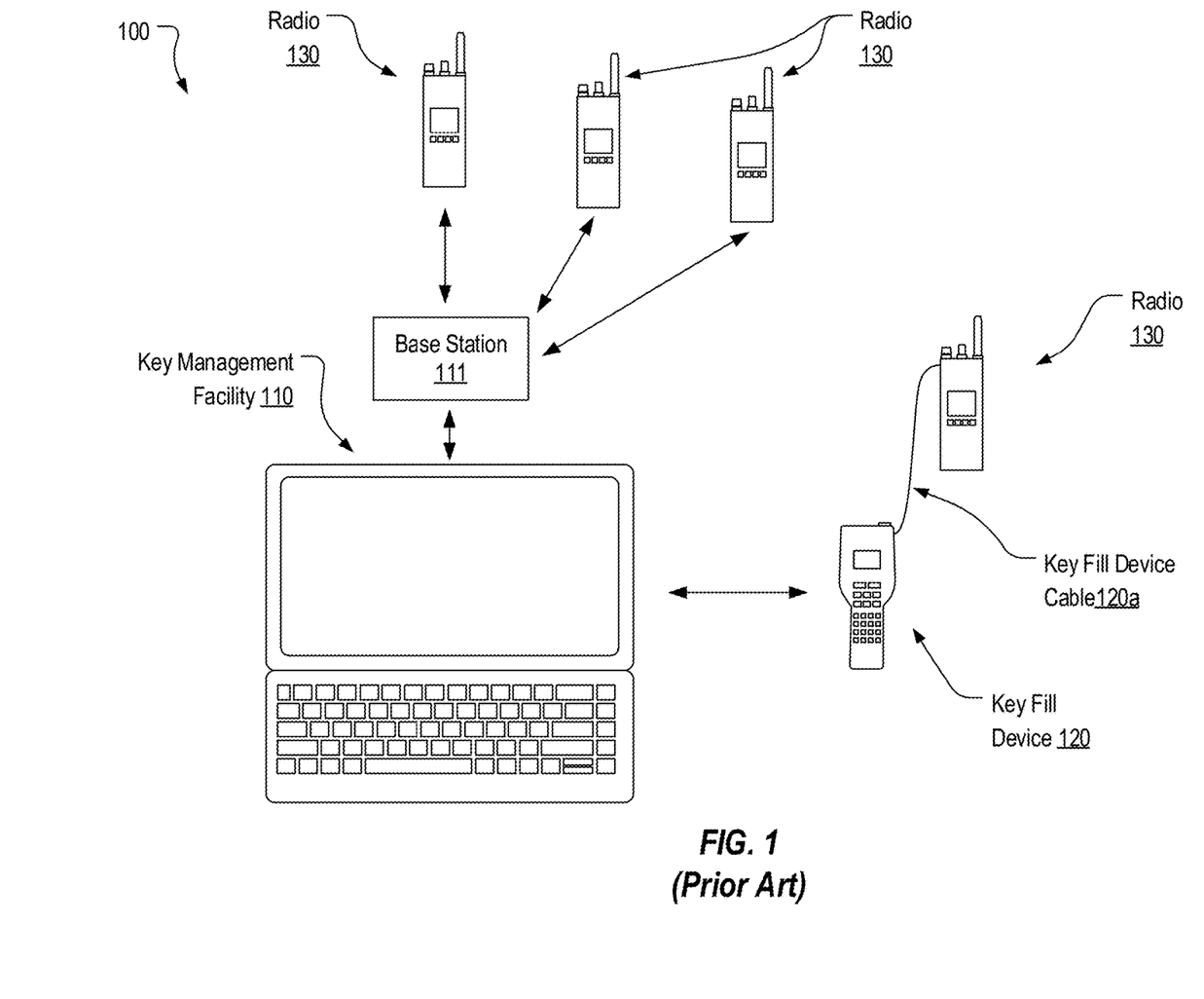
FIG. 1 provides an example of a prior art P25 communications system.

To safeguard the effectiveness of the encryption scheme, it is critical that the keysets be defined, maintained and distributed in a secure and reliable manner. A P25-compliant communication system should therefore include a "key management facility" or at least a "key fill device." FIG. 1 provides an example of a communications system 100 that may employ a key management facility 110 to manage keysets including distributing the keysets to radios 130. As represented, key management facility 110 is typically implemented as software (e.g., a Windows-based executable) that runs on a general purpose computing device such as a server. An administrator may typically use a laptop, desktop or other end user computing device to access key management facility 110.

In addition to functioning as a database for managing radios 130 and tracking keysets that are or can be provisioned to radios 130, key management facility 110 may implement "over-the-air rekeying" or OTAR to deploy new keysets to radios 130. To implement OTAR, key management facility 110 may typically be connected to conventional or trunked P25 infrastructure, such as a base station 111 or repeater, by which it transmits keysets to radios 130 (e.g., via a UHF or VHF channel). Accordingly, to implement OTAR, a key management facility 110 in the form of a desktop or laptop would require substantial additional hardware components.

Alternatively or additionally, communication system 100 may include a key fill device (or key value loader) 120 that functions as a manual tool for provisioning keysets on radios 130. When key management facility 110 employs key fill device 120 to provision a new keyset, key management facility 110 may first transfer the keyset to key fill device 120 (e.g., via a key fill device cable 120a). Alternatively, key fill device 120 may be used to manually create keysets. In either case, once it stores keysets, key fill device 120 can be physically connected to a radio 130 (e.g., via a dedicated key fill device cable 120a) and then key fill device 120 can be used to manually transfer the keyset to radio 130 using the TIA-102.AACD-A Digital Land Mobile Radio-Key Fill Device (KFD) Interface Protocol. This manual provisioning of keysets is a one-to-one process, i.e., key fill device 120 is physically connected to one radio 130 at a time.

Accordingly, a kill fill device is a simple hand-held device with limited capabilities and no network connectivity and is therefore limited to manual one-to-one interactions with radios. As such, managing a fleet of P25 radios using a key fill device can be a very tedious process. In contrast, a key management facility is usually a server that is connected to networking infrastructure (commonly a P25 trunking system) and thus can connect to a large number of radios. Although managing a fleet of radios is much easier with a key management facility, the added infrastructure and complexity that the key management facility requires makes it unsuitable for many P25 communication systems.

BRIEF SUMMARY

Embodiments of the present invention encompass a P25 radio that can function as a key management facility and/or a key fill device in a P25 communications system. A P25 radio can be configured to implement a key management facility to thereby manage keysets for and provision the keysets on other P25 radios in a P25 communications system. The P25 radio, as a radio, can directly communicate with the other P25 radios to provision the keysets in accordance with the OTAR protocol. The P25 radio may also or alternatively be configured to function as a key fill device to thereby provision keysets manually to any of the other P25 radios to which it may be physically or wirelessly connected. The P25 radio may also be configured to use the keysets to securely communicate voice and/or data communications with any of the other P25 radios.

Accordingly, a P25 radio that is configured in accordance with one or more embodiments of the present invention may provision keysets to P25 radios using both wired and wireless connections. The P25 radio may be configured to support a variety of wired connections such as RS232 or USB for connecting with and provisioning keysets to a target P25 radio. The P25 radio may be configured to support a variety of wireless connections such as Bluetooth, WiFi and P25 OTAR for connecting with and provisioning keysets to a target P25 radio. As a result, a P25 radio can be used to manage a fleet of P25 radios without the tedium and limitations of a traditional key fill device and without the infrastructure and complexity of a traditional key management facility.

In some embodiments, the present invention may be implemented as a P25 radio that includes a housing, an antenna, a display, keys, a control module for managing user input via the keys and for presenting visual content via the display, a communication module for sending and receiving communications via the antenna and a key management facility module. The key management facility module may be configured to: store one or more keysets; interface with the control module to receive user input that requests that at least one of the one or more keysets be provisioned on one or more P25 subscriber radios; and interface with the communication module to provision the at least one of the one or more keysets on the one or more P25 subscriber radios.

In some embodiments, the present invention may be implemented as a P25 radio that includes a housing, an antenna, a display, keys, a control module for managing user input via the keys and for presenting visual content via the display, a communication module for sending and receiving communications via the antenna and a key fill device module. The key fill device module may be configured to: store one or more keysets; interface with the control module to receive user input that requests that at least one of the one or more keysets be provisioned on a P25 subscriber radio; and interface with the communication module to wirelessly provision the at least one of the one or more keysets on the P25 subscriber radio.

In some embodiments, the present invention may be implemented as a method for provisioning keysets in a P25 communications system. One or more keysets may be stored on a P25 radio that includes an antenna, a display and keys. User input can be received via the keys of the P25 radio where the user input requests that at least one of the one or more keysets be provisioned on one or more P25 subscriber radios. In response to the user input, the at least one of the one or more keysets can be transmitted via the antenna of the P25 radio to the one or more P25 subscriber radios.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "P25 communications system" shall be construed as including a plurality of P25 radios that are configured to send and receive voice and/or data communications. A "P25 radio" shall be construed as a land mobile radio that is configured to communicate with other P25 radios in accordance with P25 standards. The term "encryption key" shall be construed as a key that is used to encrypt voice and/or data communications in a P25 communications system such as a traffic encryption key or TEK. The term "keyset" shall be construed as including one or more encryption keys and typically other encryption parameters such as a key encryption key or KEK, a unique key encryption key or UKEK, a key ID or KID, etc. To distinguish between a P25 radio that is configured to function as a key management facility and/or a key fill device in accordance with embodiments of the present invention and other P25 radios, the term "P25 subscriber radio" be will used to refer to any P25 radio that does not function as a key management facility or a key fill device in the P25 communications system.

Figure 2A:
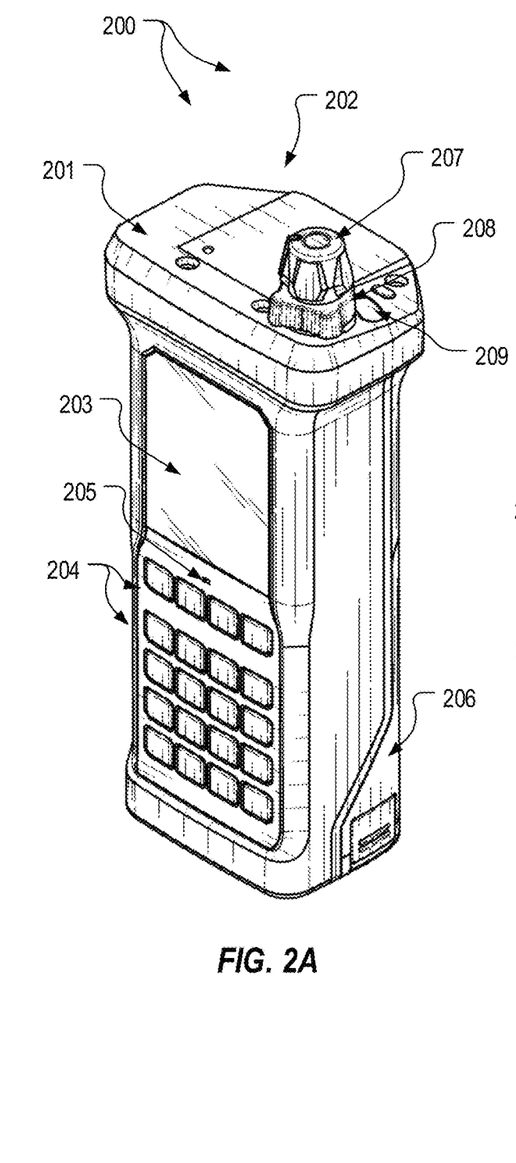
FIGS. 2A and 2B provide an example of a P25 radio that can be configured to function as a key management facility and/or a key fill device in accordance with one or more embodiments of the present invention.
Figure 2B:
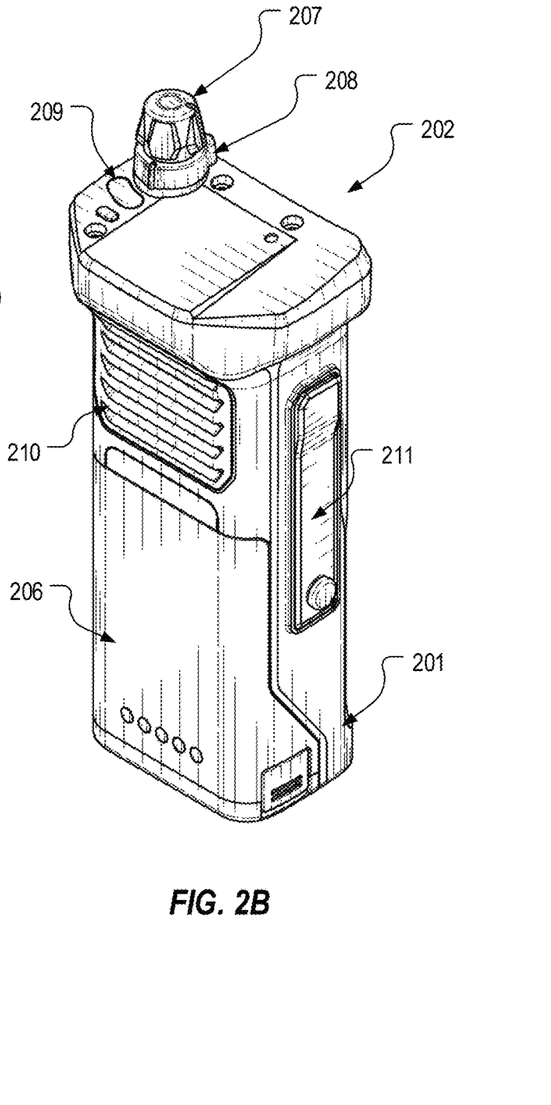

FIGS. 2A and 2B provide a first example configuration of a P25 radio 200 that may be used in embodiments of the present invention. In this first example configuration, P25 radio 200 may include a housing 201, an antenna 202, a front display 203, keys 204, a microphone 205, a battery 206, a power/volume knob 207, an encryption knob 208, an encryption indictor 209, a speaker 210 and a cover 211 under which one or more communications ports 211a may be positioned. Communication ports 211a allow P25 radio 200 to be physically connected to another P25 radio or other device. Antenna 202 could include one or more of a cellular antenna, a Wi-Fi antenna, a Bluetooth antenna, a GPS antenna, a UHF/VHF antenna, etc. In some embodiments, keys 204 may include a key for each hexadecimal character 0-F. In other embodiments, keys 204 may comprise a full QWERTY keypad.

Figure 3A:
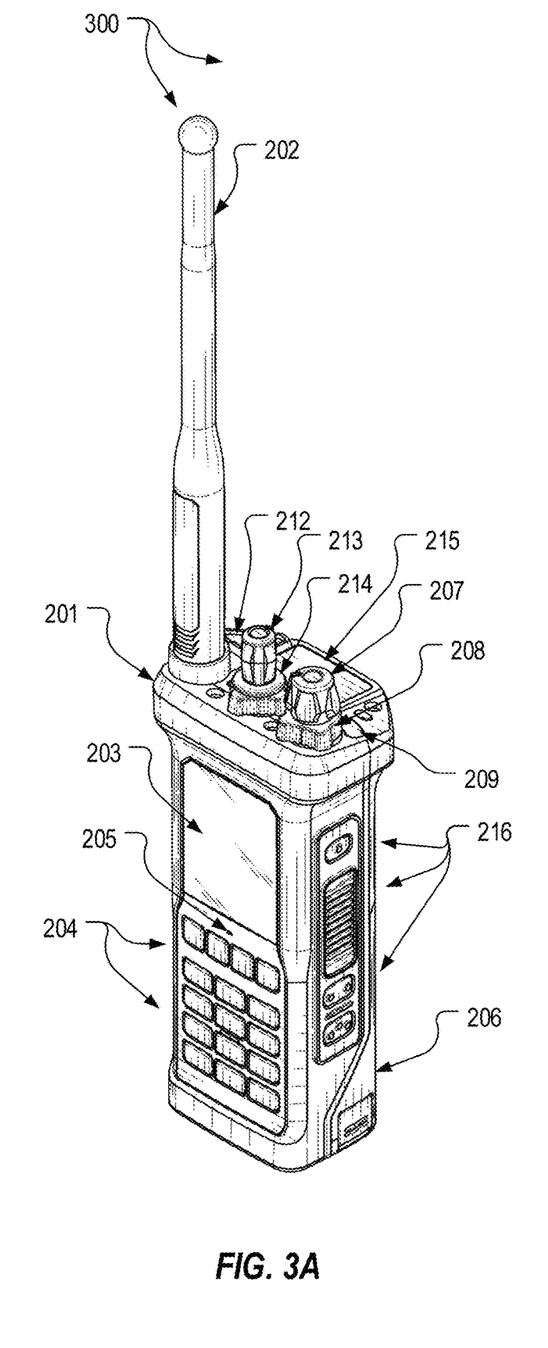
FIGS. 3A and 3B provide another example of a P25 radio that can be configured to function as a key management facility and/or a key fill device in accordance with one or more embodiments of the present invention.
Figure 3B:
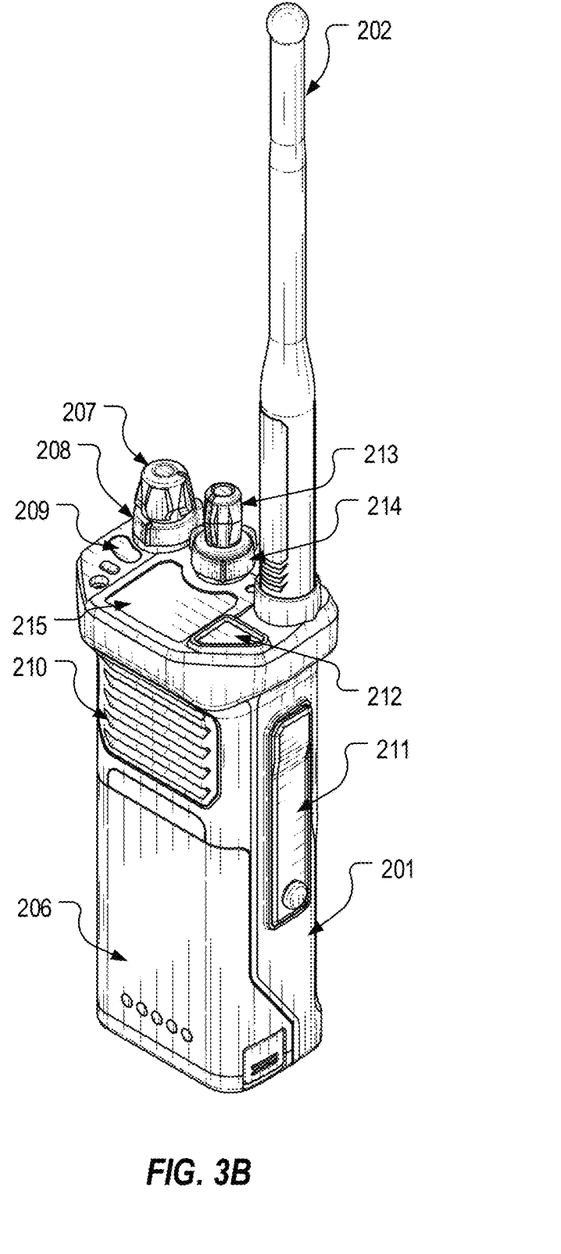

FIGS. 3A and 3B provide a second example configuration of a P25 radio 300 that may be used in embodiments of the present invention. Like P25 radio 200, P25 radio 300 includes housing 201, antenna 202, front display 203, keys 204, microphone 205, battery 206, power/volume knob 207, encryption knob 208, encryption indictor 209, speaker 210, cover 211 and communication port(s) 211a as well as an emergency button 212, a channel selector 213, a zone selector 214, a top display 215 and push-to-talk buttons 216.

In some embodiments, P25 radio 200 could represent a P25 radio that is configured to function as a key management facility and/or a key fill device within a P25 communications system while P25 radio 300 could represent P25 subscriber radios. In other embodiments, one P25 radio 300 could represent a P25 radio that is configured to function as a key management facility and/or a key fill device within a P25 communications system while other P25 radios 300 could represent P25 subscriber radios. Accordingly, a P25 radio that is configured to function as a key management facility and/or a key fill device within a P25 communications system can include any suitable combination of features that a P25 subscriber radio may have.

Figure 4:
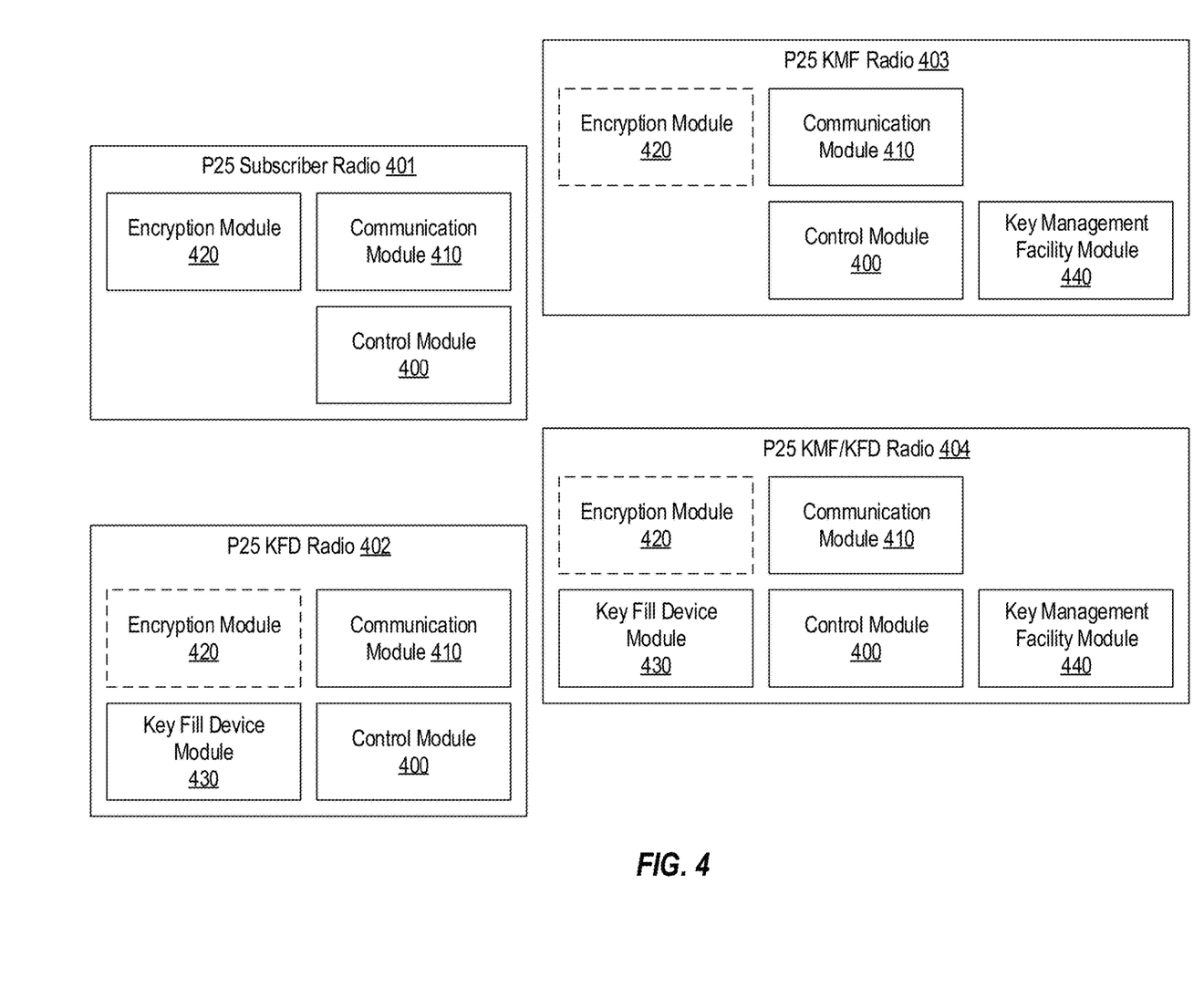
FIG. 4 provides block diagrams of various types of P25 radios that may be utilized in a P25 communications system in accordance with one or more embodiments of the present invention.

FIG. 4 provides block diagrams of different configurations of P25 radios that may be utilized in a P25 communications system in one or more embodiments of the present invention. These different configurations of P25 radios include P25 subscriber radio 401, P25 Key Fill Device (KFD) radio 402, P25 Key Management Facility (KMF) radio 403 and P25 KMF/KFD radio 404. Each of these different configurations of P25 radios include various modules which can represent any suitable arrangement of circuitry, code and/or other components for implementing the corresponding functionality.

P25 subscriber radio 401 includes a control module 400 which can represent the components that perform general control functionality on a P25 radio such as detecting and managing user input, generating audio/visual output, coordinating interactions with and between other modules, etc. P25 subscriber radio 401 also includes a communication module 410 which can represent the components of a P25 radio that implement communication functionality such as one or more communication protocol stacks. When sending or receiving secure voice or data communications, communication module 410 can leverage encryption module 420. For example, encryption module 420 can represent the stored keysets and the components that use such keysets to encrypt or decrypt voice and data communications in accordance with the P25 standards. Accordingly, control module 400, communication module 410 and encryption module 420 can generally represent the components that would exist on any radio that is capable of communicating voice or data communications securely using P25 techniques.

P25 KFD Radio 402 also includes control module 400, communication module 410 and optionally encryption module 420 (as represented by the dashed line). Accordingly, P25 KFD radio 402 can be used as a P25 radio including, if it includes encryption module 420, to communicate voice and data communications securely with other P25 radios. Additionally, P25 KFD radio 402 includes key fill device module 430 which can represent the components that are configured to enable P25 KFD radio 402 to function as a key fill device. Notably, key fill device module 430 can leverage control module 400 and communication module 410 to implement key fill device functionality as further described below.

P25 KMF Radio 403 also includes control module 400, communication module 410 and optionally encryption module 420. Accordingly, P25 KMF radio 403 can be used as a P25 radio including, if it includes encryption module 420, to communicate voice and data communications securely with other P25 radios. Additionally, P25 KMF radio 403 includes key management facility module 440 which can represent the components that are configured to enable P25 KMF radio 403 to function as a key management facility. Notably, key management facility module 440 can leverage control module 400 and communication module 410 to implement key management facility functionality as further described below.

P25 KMF/KFD Radio 404 includes control module 400, communication module 410, optionally encryption module 420, key fill device 430 and key management facility module 440. Accordingly, in addition to being capable of functioning as a P25 subscriber radio, P25 KMF/KFD radio 404 can function as a key management facility and a key fill device. Although key fill device module 430 and key management facility module 440 are illustrated as separate modules, they need not be. The illustration is intended only to represent that a P25 radio could be configured to function only as a key fill device, only as a key management facility or as both a key fill device and a key management facility.

As an overview, key fill device module 430 can interface with control module 400 and communication module 410 to enable a user to cause P25 KFD radio 402 or P25 KMF/KFD radio 404 to provision one or more keysets to encryption module 420 on any P25 subscriber radio 401 via a wired or wireless connection to thereby enable each P25 subscriber radio 401 to use the keysets to securely send and receive voice and data communications with other P25 subscriber radios 401.

Also as an overview, key management facility module 440 can interface with control module 400 and communication module 410 to enable a user to cause P25 KMF radio 403 or P25 KMF/KFD radio 404 to provision one or more keysets to encryption module 420 on any P25 subscriber radio 401 via the OTAR protocol to thereby enable each P25 subscriber radio 401 to use the keysets to securely send and receive voice and data communications with other P25 subscriber radios 401.

Figure 5A:
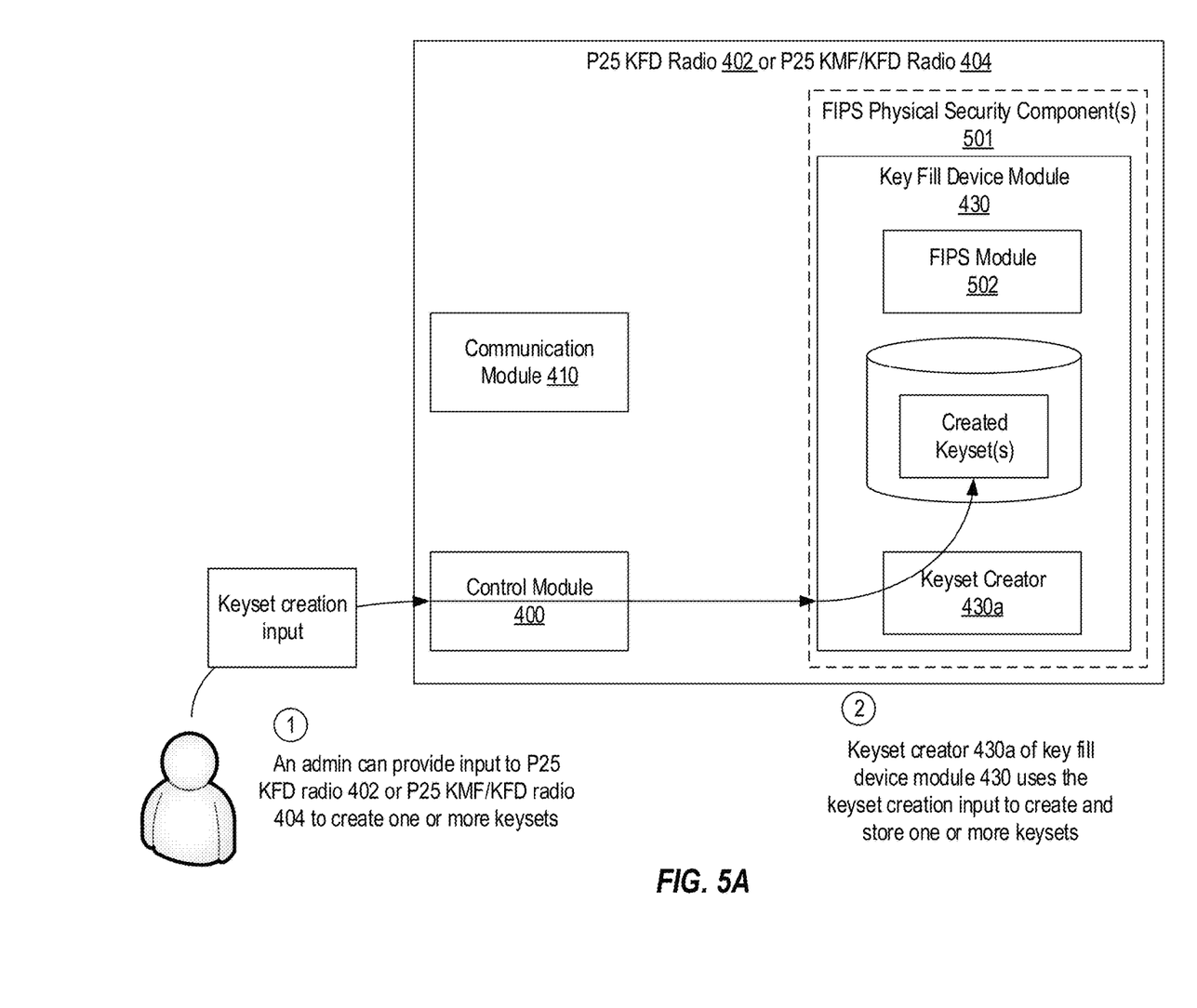
FIGS. 5A and 5B provide examples of how a P25 radio can function as a key fill device and a key management facility to create keysets that can be deployed to P25 subscriber radios.
Figure 5B:
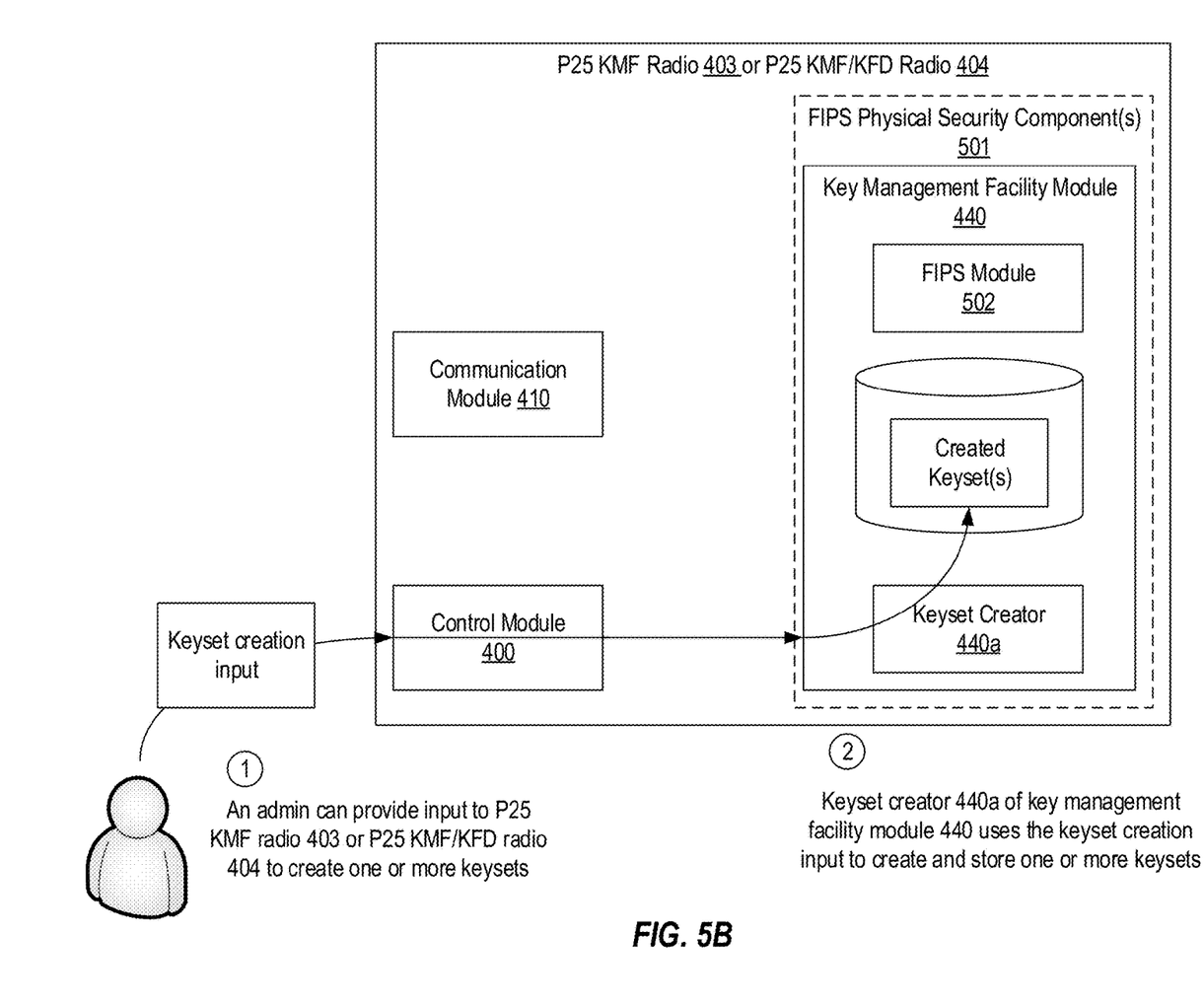

FIG. 5A provides an example of how an admin (or operator) may use P25 KFD Radio 402 or P25 KMF/KFD Radio 404 to cause key fill device module 430 to create one or more keysets that it can subsequently provision on P25 subscriber radios 401. In step 1, an administrator can provide keyset creation input for causing key fill device module 430 to create one or more keysets. For example, the admin may use keys 204 to access a keyset creation display on front display 203 and to input characters (e.g., hexadecimal values) defining an encryption key. Then, in step 2, and in response to the keyset creation input that control module 400 relays to it, a key creator 430a of key fill device module 430 can create and store one or more keysets on P25 KFD Radio 402 or P25 KMF/KFD Radio 404. FIG. 5B provides a similar example of how an admin may use P25 KMF Radio 403 or P25 KMF/KFD Radio 404 to cause a key creator 440a of key management facility module 440 to create one or more keysets that it can subsequently deploy to P25 subscriber radios 401. Although not shown, in some embodiments, keysets could be created on a separate device and then transferred to key fill device module 430 or key management facility module 440 as opposed to being directly created by key fill device module 430 or key management facility module 440.

In FIGS. 5A and 5B, each radio 402-404 is shown as including Federal Information Processing Standards (FIPS) physical security component(s) 501 which can represent any suitable mechanism for providing physical security to key fill device module 430 and key management facility module 440 in accordance with FIPS 140-2 or any equivalent standard. For example, FIPS physical security component(s) 501 can represent tamper-evident materials or structures that secure the circuitry in which key fill device module 430 and key management facility module 440 are implemented. FIGS. 5A and 5B also show that a FIPS module 502 can be implemented within or in conjunction with key fill device module 430 and key management facility module 440. FIPS module 502 can implement security protections for keysets and other sensitive content stored in or by key fill device module 430 and key management facility module 440 in accordance with FIPS 140-2 or any equivalent standard. For example, FIPS module 502 may require a user to authenticate prior to gaining access to any secure functionality that key fill device module 430 or key management facility module 440 provides. In some embodiments, FIPS physical security component(s) 501 and FIPS module 502 may comply with Security Level 3 as defined in FIPS PUB 140-2.

Figure 6A:
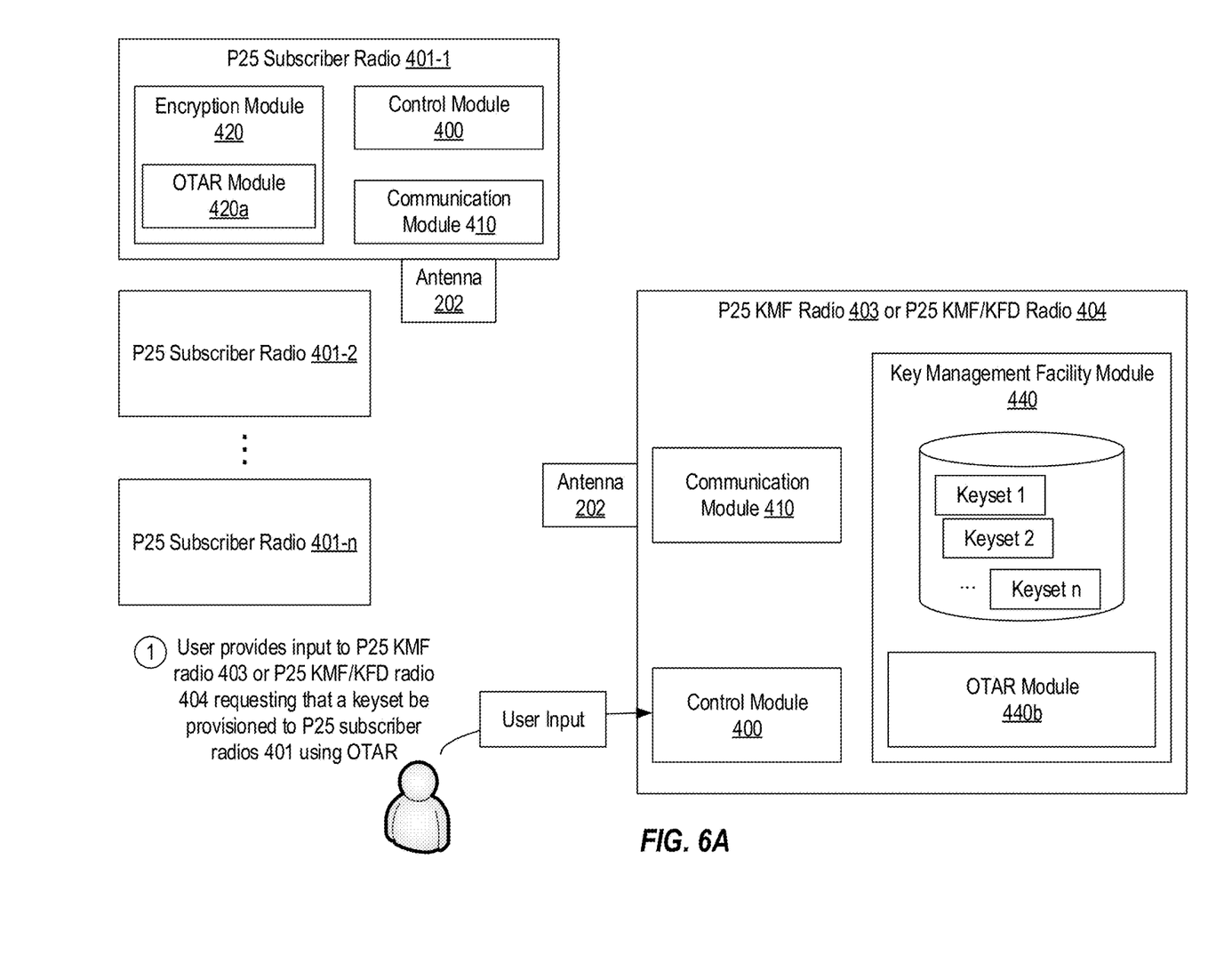
FIGS. 6A and 6B provide an example of how a P25 radio can be configured to function as a key management facility to provision keysets on P25 subscriber radios via the OTAR protocol.
Figure 6B:
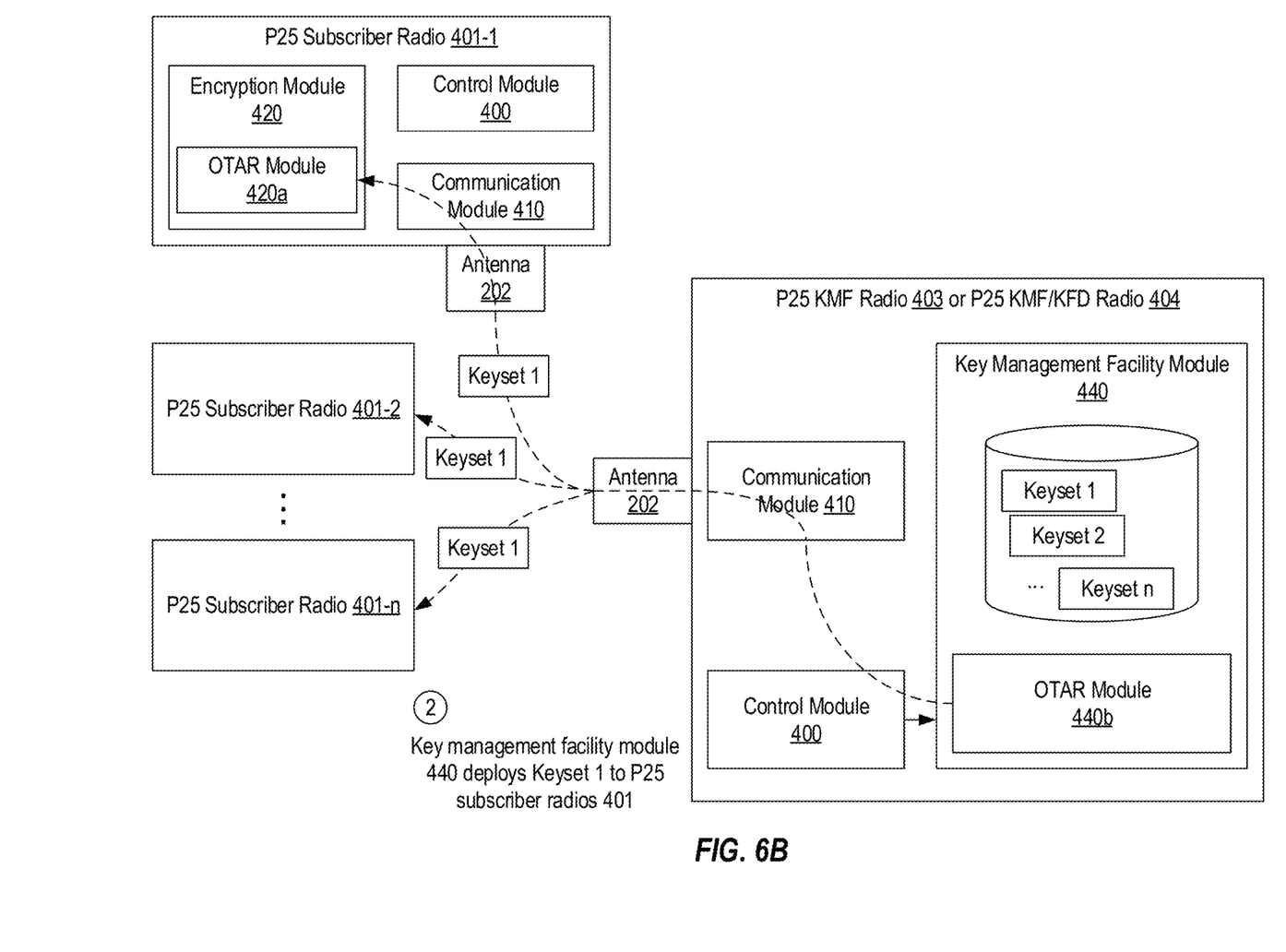

FIGS. 6A and 6B provide an example of how key management facility module 440 can enable P25 KMF radio 403 or P25 KMF/KFD radio 404 to function as a key management facility in provisioning a keyset on multiple P25 subscriber radios 401-1 through 401-n (collectively "P25 subscriber radios 401"). In these figures, key management facility module 440 is shown as including an OTAR module 440b that can represent the components that implement the key management facility side of the OTAR protocol and a database for storing/managing keysets that can be deployed. In contrast, encryption module 420 on P25 subscriber radios 401 is shown as including an OTAR module 420a that can represent the components that implement the subscriber side of the OTAR protocol.

In step 1 shown in FIG. 6A, a user provides input to P25 KMF radio 403 or P25 KMF/KFD radio 404 requesting that keyset 1 be provisioned on P25 subscriber radios 401 using the OTAR protocol. For example, step 1 could entail control module 400 detecting a user's interactions with keys 204 and relaying such interactions to key management facility module 440.

Turning to FIG. 6B, in response to the user input, in step 2, key management facility module 440 can leverage OTAR module 440b to initiate the OTAR protocol with OTAR module 420a on each P25 subscriber radio 401 to thereby provision keyset 1 to encryption module 420 on P25 subscriber radios 401. Notably, because key management facility module 440 is implemented on P25 KMF radio 403 or P25 KMF/KFD radio 404, it can use communication module 410 and antenna 202 to directly transmit keyset 1 (e.g., via any VHF, UHF, 700 band or 800 band channel). In this way, P25 KMF radio 403 or P25 KMF/KFD radio 404, which is a land mobile radio that may be configured to communicate with other P25 radios in accordance with P25 standards, can fill the role of the key management facility in a P25 communications system.

Figure 7A:
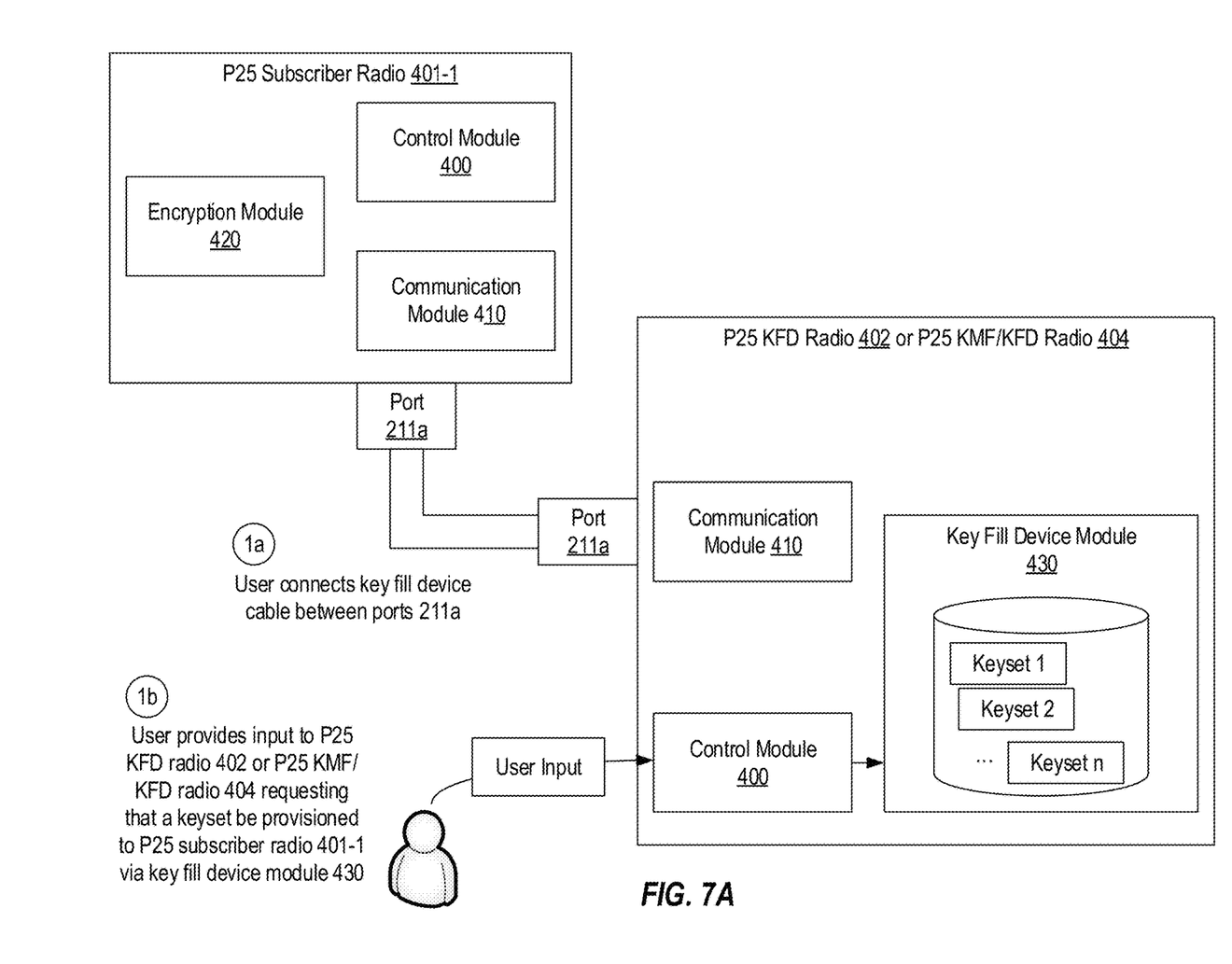
FIGS. 7A and 7B provide an example of how a P25 radio can be configured to function as a key fill device to provision keysets on P25 subscriber radios via wired connections.
Figure 7B:
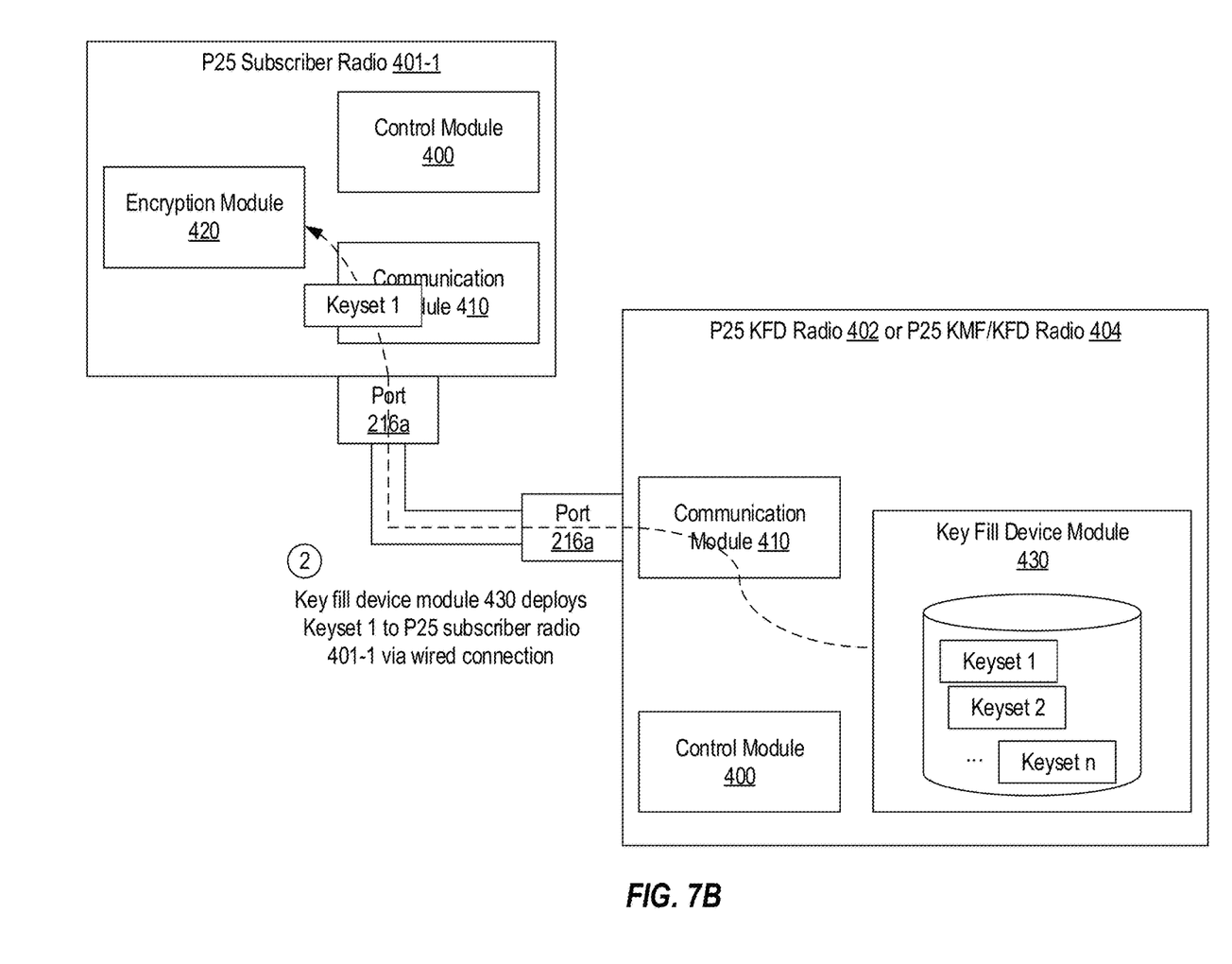

FIGS. 7A and 7B provide an example of how key fill device module 430 can enable P25 KFD radio 402 or P25 KMF/KFD radio 404 to function as a key fill device in provisioning a keyset on P25 subscriber radios 401-1. In step 1a shown in FIG. 7A, a user can connect a cable between a port 211a of P25 subscriber radio 401-1 and a port 211a of a P25 KFD radio 402 or P25 KMF/KFD radio 404. Then, in step 1b, the user can provide input to P25 KFD radio 402 or P25 KMF/KFD radio 404 requesting that keyset 1 be provisioned on P25 subscriber radio 401-1. For example, step 1b could entail control module 400 detecting a user's interactions with keys 204 and relaying such interactions to key fill device module 430. Turning to FIG. 7B, in response to the user input, in step 2, key fill device module 430 can transfer keyset 1 to encryption module 420 on P25 subscriber radios 401-1 via the wired connection. The keyset can then be stored and utilized by encryption module 420 to secure voice or data communications that P25 subscriber radio 401-1 may send or receive.

Figure 8A:
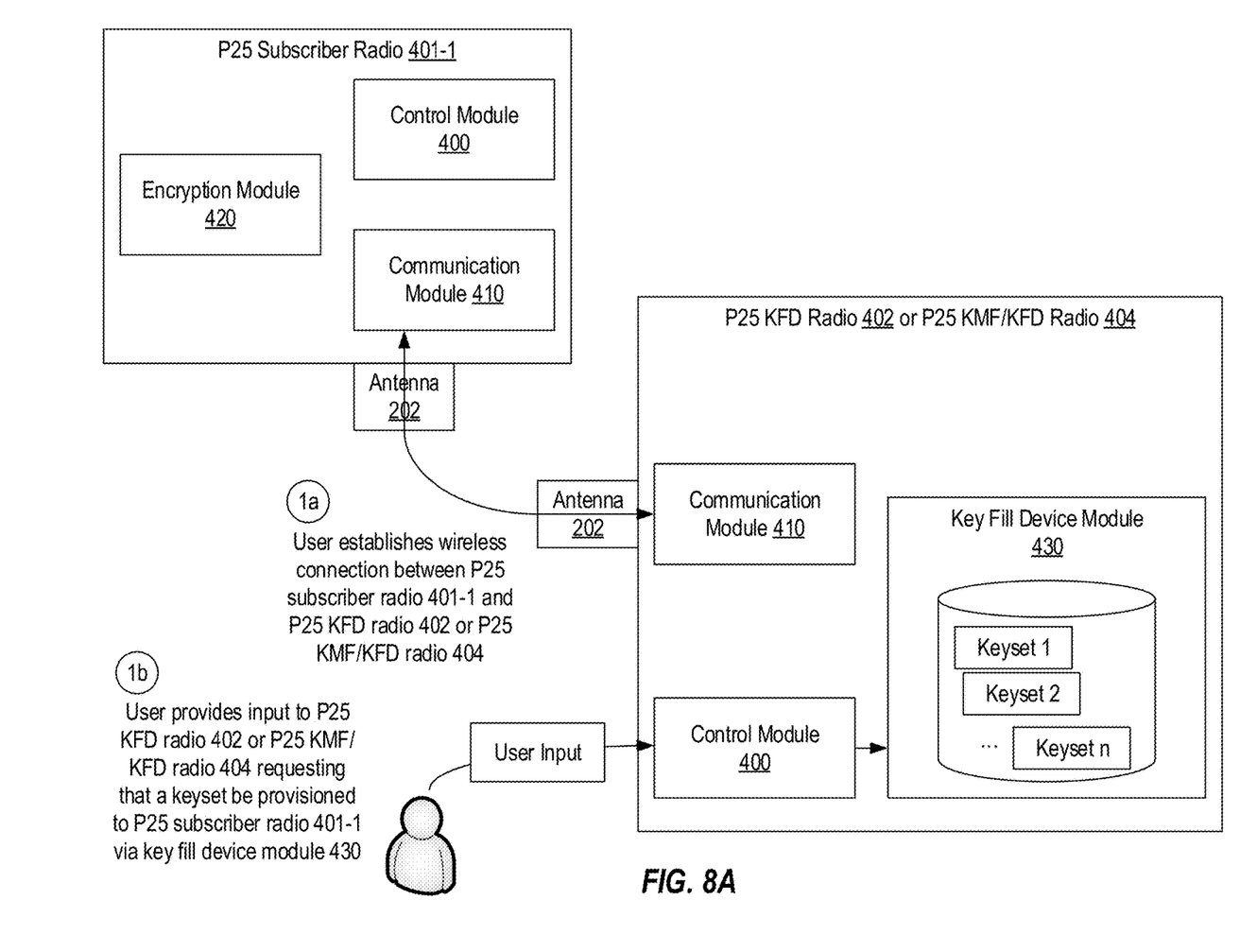
FIGS. 8A and 8B provide an example of how a P25 radio can be configured to function as a key fill device to provision keysets on P25 subscriber radios via wireless connections.
Figure 8B:
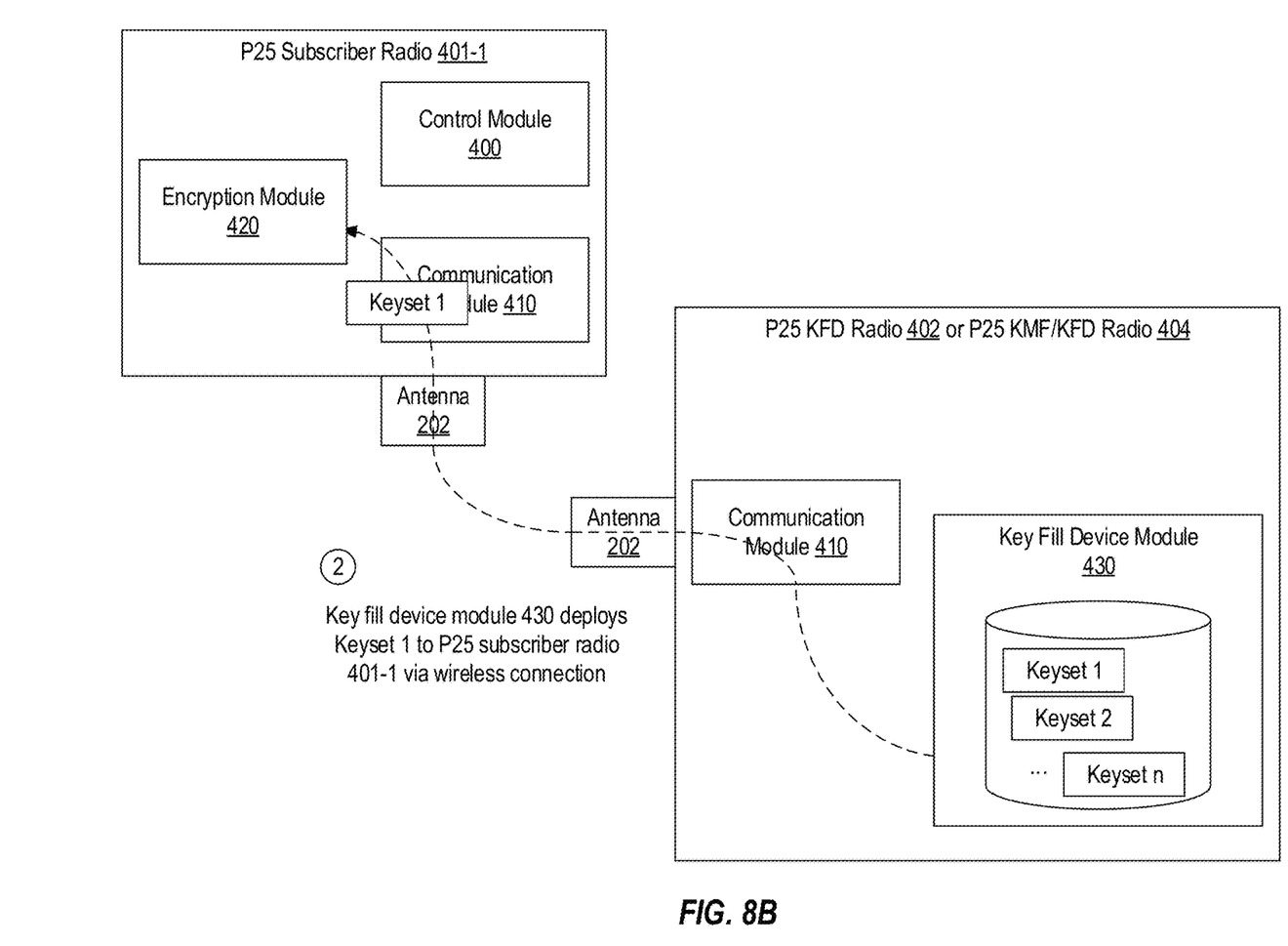

FIGS. 8A and 8B provide a similar example of how key fill device module 430 can enable P25 KFD radio 402 or P25 KMF/KFD radio 404 to function as a key fill device in provisioning a keyset on P25 subscriber radios 401-1. In step 1a shown in FIG. 8A, a user can establish a wireless connection between P25 subscriber radio 401-1 and P25 KFD radio 402 or P25 KMF/KFD radio 404. For example, this wireless connection could be a Wi-Fi connection, a Bluetooth connection, a UHF connection, a VHF connection, etc. Then, in step 1b, the user can provide input to P25 KFD radio 402 or P25 KMF/KFD radio 404 requesting that keyset 1 be provisioned on P25 subscriber radio 401-1. For example, step 1b could entail control module 400 detecting a user's interactions with keys 204 and relaying such interactions to key fill device module 430. Turning to FIG. 8B, in response to the user input, in step 2, key fill device module 430 can transmit keyset 1 to encryption module 420 on P25 subscriber radios 401-1 via the wireless connection.

Figure 9:
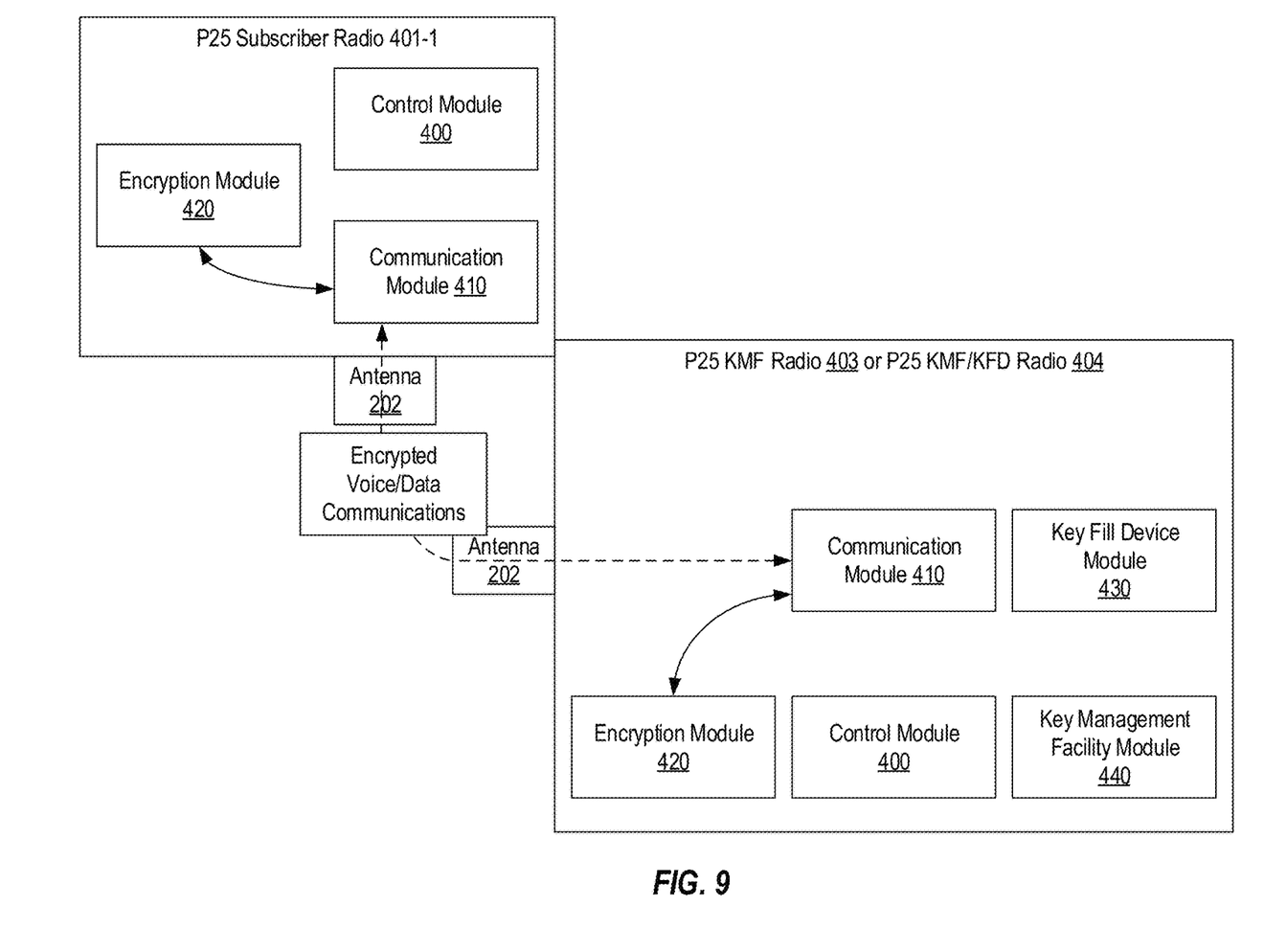
FIG. 9 provides an example of how a P25 radio that functions as a key fill device and/or a key management facility may also function as a P25 subscriber radio.

FIG. 9 provides an example of how, in some embodiments, P25 KFD radio 402 or P25 KMF/KFD radio 404 can use encryption module 420 to securely communicate voice and data communications with P25 subscriber radio 401-1. In this example, it can be assumed that keyset 1 has been stored in encryption module 420 on P25 subscriber radio 401-1 and in encryption module 420 on P25 KFD radio 402 or P25 KMF/KFD radio 404 (i.e., the functionality depicted in FIG. 9 can occur after the functionality depicted in FIGS. 6A and 6B). Accordingly, encryption module 420 on the respective P25 radios can encrypt and decrypt voice and data communications using an encryption key included in keyset 1 to thereby secure communications that are sent between the two P25 radios. FIG. 9 can therefore represent that P25 KFD radio 402, P25 KMF radio 403 and P25 KMF/KFD radio 404 can retain their ability to securely communicate voice and data communications in accordance with the P25 standards with other P25 radios in the P25 communications system while also functioning as a key management facility and/or a key fill device in the P25 communications system.

Accordingly, a P25 radio that is configured in accordance with one or more embodiments of the present invention may function: (1) as a key fill device that can connect via a cable to a P25 subscriber radio to provision keysets on the P25 subscriber radio; (2) as a key fill device that can connect wirelessly to a P25 subscriber radio to provision keysets on the P25 subscriber radio; (3) as a key management facility that manages and provisions keysets across a fleet of P25 subscriber radios using the OTAR protocol; and (4) optionally as a P25 subscriber radio.

In summary, embodiments of the present invention enable a P25 radio to function as a key fill device and/or a key management facility in a P25 communications system. As a P25 radio, the key fill device or key management facility can leverage built-in communication functionality to provision keysets on P25 subscriber radios. As a result, there is no need for a dedicated computing device and supporting P25 infrastructure to implement a key management facility.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A P25 radio comprising:
a housing;
an antenna;
a display;
keys;
a control module for managing user input via the keys and for presenting visual content via the display;

a communication module for sending and receiving voice communications with other P25 radios via the antenna; and
a key management facility module that is configured to:
store one or more keysets;
interface with the control module to receive user input that requests that at least one of the one or more keysets be provisioned on one or more of the other P25 radios; and
interface with the communication module to provision the at least one of the one or more keysets on the one or more of the other P25 radios such that the P25 radio provisions the at least one of the one or more keysets on the one or more of the other P25 radios.

2. The P25 radio of claim 1, wherein interfacing with the communication module to provision the at least one of the one or more keysets on the one or more of the other P25 radios comprises implementing the over-the-air rekeying (OTAR) protocol to provision the at least one of the one or more keysets on the one or more of the other P25 radios.

3. The P25 radio of claim 1, wherein the one or more of the other P25 radios comprise a plurality of the other P25 radios.

4. The P25 radio of claim 1, wherein the key management facility module is further configured to create the one or more keysets in response to receiving keyset creation input via the keys such that the P25 radio creates the one or more keysets.

5. The P25 radio of claim 1, further comprising:
a key fill device module that is configured to provision at least one of the one or more keysets on one of the other P25 radios via a direct connection such that the P25 radio provisions at least one of the one or more keysets on the one of the other P25 radios via the direct connection.

6. The P25 radio of claim 1, further comprising:
a port;
wherein the direct connection is a wired connection.

7. The P25 radio of claim 1, wherein the direct connection is a wireless connection.

8. The P25 radio of claim 7, wherein the wireless connection is one of a Wi-Fi connection, a Bluetooth connection, a VHF connection or a UHF connection.

9. The P25 radio of claim 1, further comprising:
one or more FIPS physical security components and a FIPS module that secure the key management facility module.

10. A P25 radio comprising:
a housing;
an antenna;
a display;
keys;
a control module for managing user input via the keys and for presenting visual content via the display;
a communication module for sending and receiving voice communications with other P25 radios via the antenna; and
a key fill device module that is configured to:
store one or more keysets;
interface with the control module to receive user input that requests that at least one of the one or more keysets be provisioned on one or more of the other P25 radios; and
interface with the communication module to wirelessly provision the at least one of the one or more keysets on the other P25 radio such that the P25 radio wirelessly provisions the at least one of the one or more keysets on the one or more of the other P25 radios.

11. The P25 radio of claim 10, wherein interfacing with the communication module to wirelessly provision the at least one of the one or more keysets on the one or more of the other P25 radios comprises establishing a Wi-Fi, Bluetooth, VHF or UHF connection with the one or more of the other P25 radios.

12. The P25 radio of claim 10, further comprising:
a port;
wherein the key fill device module is further configured to:
interface with the control module to receive additional user input that requests that at least one of the one or more keysets be provisioned on a second radio of the other P25 radios; and
interface with the communication module to provision the at least one of the one or more keysets on the second radio of the other P25 radios via the port such that the P25 radio provisions the at least one of the one or more keysets on the second radio of the other P25 radios via the port.

13. The P25 radio of claim 10, wherein the key fill device module is further configured to create the one or more keysets in response to receiving keyset creation input via the keys such that the P25 radio creates the one or more keysets.

14. The P25 radio of claim 10, further comprising:
a key management facility module that is configured to:
interface with the control module to receive user input that requests that at least one of the one or more keysets be provisioned on one or more additional P25 radios of the other P25 radios; and
interface with the communication module to provision the at least one of the one or more keysets on the one or more additional radios of the other P25 radios using the over-the-air rekeying (OTAR) protocol such that the P25 radio provisions the at least one of the one or more keysets on the one or more additional radios of the other P25 radios using the OTAR protocol.

15. The P25 radio of claim 10, further comprising:
one or more FIPS physical security components and a FIPS module that secure to the key fill device module.

16. The P25 radio of claim of claim 10, further comprising:
an encryption module that employs at least one of the one or more keysets to securely communicate voice or data communications with the other P25 radios such that the P25 radio employs at least one of the one or more keysets to securely communicate voice or data communications with the other P25 radios in addition to wirelessly provisioning the at least one of the one or more keysets on the other P25 radio.

17. A method for deploying keysets in a P25 communications system, the method comprising:
storing one or more keysets on a P25 radio that includes an antenna, a display and keys;
receiving user input via the keys of the P25 radio, the user input requesting that at least one of the one or more keysets be provisioned on one or more other P25 radios;
in response to the user input, causing the at least one of the one or more keysets to be transmitted via the antenna of the P25 radio to the one or more other P25 radios to thereby provision the at least one of the one or more keysets on the one or more other P25 radios; and employing the at least one of the one or more keysets to securely communicate voice or data communications with the one or more other P25 radios such that the P25 radio employs at least one of the one or more keysets to securely communicate voice or data communications with the one or more other P25 radios in addition to causing the at least one of the one or more keysets to be transmitted via the antenna of the P25 radio to the one or more other P25 radios to thereby provision the at least one of the one or more keysets on the one or more other P25 radios.

18. The method of claim 17, wherein causing the at least one of the one or more keysets to be transmitted via the antenna of the P25 radio to the one or more other P25 radios comprises implementing the over-the-air-rekeying (OTAR) protocol.

19. The method of claim 17, wherein causing the at least one of the one or more keysets to be transmitted via the antenna of the P25 radio to the one or more other P25 radios comprises causing the at least one of the one or more keysets to be transmitted over a direct connection established with a first other P25 radio via the antenna of the P25 radio.

20. The method of claim 17, further comprising:
causing at least one of the one or more keysets to be transmitted to a second other P25 radio via a cable that is connected to a port of the P25 radio.

\* \* \* \* \*